US008035598B2

(12) United States Patent
Liao et al.

(10) Patent No.: US 8,035,598 B2
(45) Date of Patent: Oct. 11, 2011

(54) METHOD FOR IMPROVING IMAGE STICKING OF LIQUID CRYSTAL DISPLAYS

(75) Inventors: Pei-Chun Liao, Hsin-Chu (TW); Ting-Jui Chang, Hsin-Chu (TW); Pin-Miao Liu, Hsin-Chu (TW); Chien-Huang Liao, Hsin-Chu (TW); Yu-Chieh Chen, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 765 days.

(21) Appl. No.: 12/164,111

(22) Filed: Jun. 30, 2008

(65) Prior Publication Data

US 2009/0213284 A1 Aug. 27, 2009

(30) Foreign Application Priority Data

Feb. 27, 2008 (TW) ................................ 97106791 A

(51) Int. Cl.
*G09G 3/36* (2006.01)
*G02F 1/133* (2006.01)

(52) U.S. Cl. ................ 345/95; 345/87; 345/88; 345/94; 349/19; 349/33; 349/38

(58) Field of Classification Search .................... 345/55, 345/76, 77, 84, 87, 88, 90, 92, 94, 95, 204, 345/208, 210, 690; 349/19, 33, 37, 38
See application file for complete search history.

(56) References Cited

U.S. PATENT DOCUMENTS

| | | | | |
|---|---|---|---|---|
| 6,809,746 | B2 * | 10/2004 | Whittington et al. | 345/690 |
| 6,919,869 | B2 * | 7/2005 | Yoshikawa | 345/89 |
| 7,339,566 | B2 * | 3/2008 | Moh | 345/90 |
| 7,864,149 | B2 * | 1/2011 | Do et al. | 345/92 |
| 2008/0111767 | A1 * | 5/2008 | Liu et al. | 345/58 |
| 2011/0080396 | A1 * | 4/2011 | Liu et al. | 345/212 |
| 2011/0115780 | A1 * | 5/2011 | Liu et al. | 345/212 |

FOREIGN PATENT DOCUMENTS

| | | |
|---|---|---|
| CN | 1908792 A | 2/2007 |
| CN | 1932957 | 3/2007 |

* cited by examiner

*Primary Examiner* — My-Chau T Tran
(74) *Attorney, Agent, or Firm* — Winston Hsu; Scott Margo

(57) ABSTRACT

Improving image sticking of a liquid crystal display (LCD) including a plurality of pixels, each of which includes a first subpixel and a second subpixel, includes driving the first subpixels of the pixels with a first optimized common voltage, driving the second subpixels of the pixels with a second optimized common voltage, and driving the LCD with a panel voltage. The panel voltage is between the first and the second optimized common voltages.

9 Claims, 16 Drawing Sheets

METHOD FOR IMPROVING IMAGE STICKING OF LIQUID CRYSTAL DISPLAYS

BACKGROUND OF THE INVENTION

1. Field of the Invention

The present invention is related to methods for improving image sticking of liquid crystal displays (LCDs), and more particularly, to a method of utilizing a residual voltage to improve the image sticking of the LCD.

2. Description of the Prior Art

FIG. 1 is a diagram of a liquid crystal display (LCD) according to the prior art. The LCD 100 is formed of two glass substrates: an upper layer UL and a lower layer LL. A liquid crystal layer LCL is infused between the two glass substrates. The liquid crystal layer comprises liquid crystals LC. A top of the glass substrate LL comprises a plurality of data lines and a plurality of scan lines, and a plurality of pixel regions are formed by intersections of the plurality of scanlines and the plurality of data lines. However, the structure described above is not ideal in practice, thus the liquid crystal layer LCL is not only filled with the liquid crystals LC, but also contains impurities P. As shown, the impurities P may be positively charged or negatively charged.

FIG. 2 is a diagram of the LCD of the prior art when displaying an image. As shown, when displaying the image, a voltage difference is generated across the glass substrates UL and LL to cause the liquid crystals LC to turn. In other words, an electric field E is established across the glass substrates UL and LL. As the liquid crystals LC turn, the impurities P will also move with the electric field according to their individual electric charges.

FIG. 3 is a diagram of the LCD of the prior art after having displayed the image for a period of time. As shown, after displaying the image for the period of time, the electric field E established across the glass substrates UL and LL makes shifting of the impurities P more thorough. Thus, the impurities P charged positively congregate on one side, whereas the impurities P charged negatively congregate on another side. In this situation, because the impurities P shift slowly, after the electric field E disappears, the impurities P will not immediately return to the original state. Thus, the impurities P will generate another electric field in the liquid crystal layer LCL, such that the liquid crystals LC, which were supposed to return to their predetermined positions, are affected, such that they are unable to return to their predetermined positions. In other words, if the originally preset electric field is E1, the impurities P congregate to generate an electric field E2. Under perfect conditions, the electric field that the liquid crystals LC experience is E1, and the liquid crystals LC are able to return to their predetermined positions according to the electric field E1. However, due to the effect of the electric field E2 caused by the impurities P, the electric field experienced by the liquid crystals LC becomes E1+E2 in practice. Thus, the liquid crystals LC are unable to return to predetermined positions easily, causing an image sticking phenomenon.

FIG. 4 is a second diagram of the image after displaying the image for a period of time with a conventional LCD. The direction of the shift in the impurities P is not only affected by the electric field E, but also by the turning of the liquid crystals LC. As shown in FIG. 4, because the liquid crystals are slanted slightly by the electric field E, the impurities P will not only shift in the vertical direction, but will also shift in the horizontal direction. The movement of the impurities P will result in trapping of the impurities P between a certain few pixels of the LCD 100 (trapping is related to the image displayed), such that the influence of the impurities P on pixels where more of the impurities P are trapped is greater, and the influence of the impurities P on pixels where fewer of the impurities P are trapped is less. When this happens, the electric field experienced by the liquid crystals of the pixels with more trapped impurities P will have a marked difference from the electric field experienced by the liquid crystals of the pixels with fewer trapped impurities P. This causes a non-uniform condition when displaying the image, and is also known as line image sticking.

SUMMARY OF THE INVENTION

According to the present invention, in a liquid crystal display (LCD) having a plurality of pixels, each pixel comprising a first subpixel and a second subpixel, a method of improving image sticking comprises driving the first subpixel of the plurality of pixels with a first optimized common voltage, driving the second subpixel of the plurality of pixels with a second optimized common voltage, and driving the LCD with a panel voltage. The panel voltage is between the first optimized common voltage and the second optimized common voltage. These and other objectives of the present invention will no doubt become obvious to those of ordinary skill in the art after reading the following detailed description of the preferred embodiment that is illustrated in the various figures and drawings.

DETAILED DESCRIPTION

Thus, the present invention discloses a method for leaving a residual voltage on an LCD to generate a vertically oriented electric field for reducing a shifting sped of impurities in the horizontal direction, so as to lower the occurrence of line image sticking.

Figure 1:
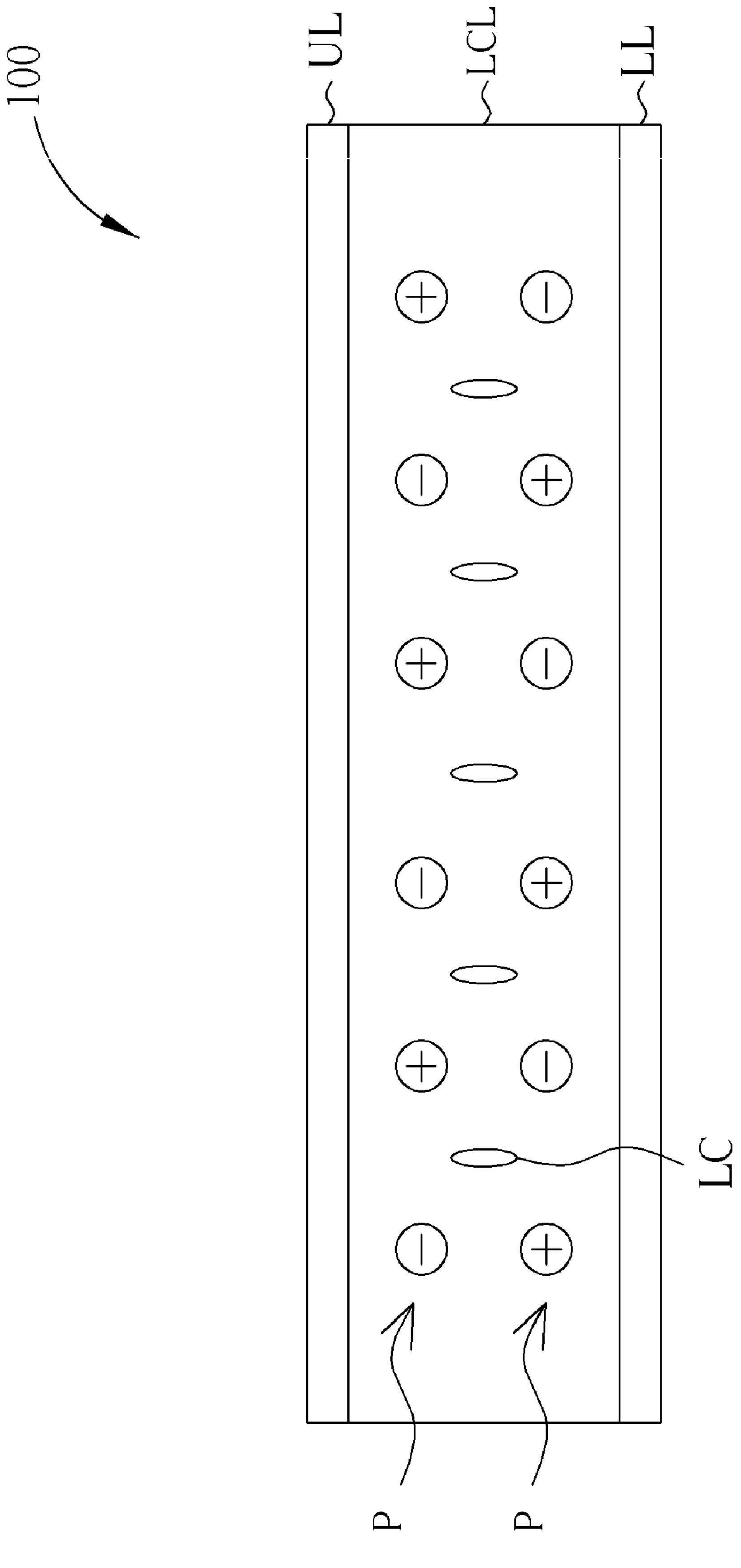
FIG. 1 PRIOR ART
FIG. 1 is a diagram of a conventional liquid crystal display (LCD).
Figure 2:
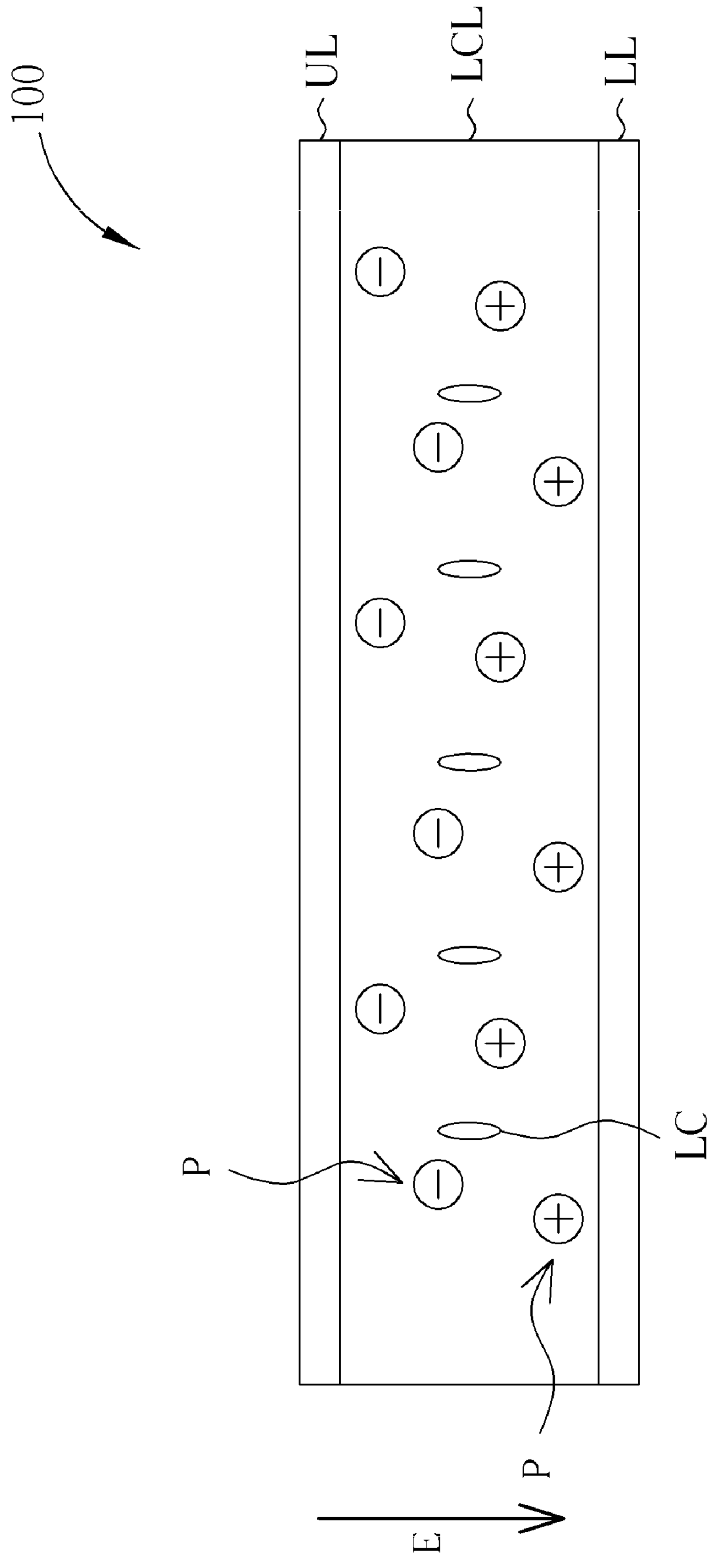
FIG. 2 PRIOR ART
FIG. 2 is a diagram of a conventional LCD when displaying an image.
Figure 3:
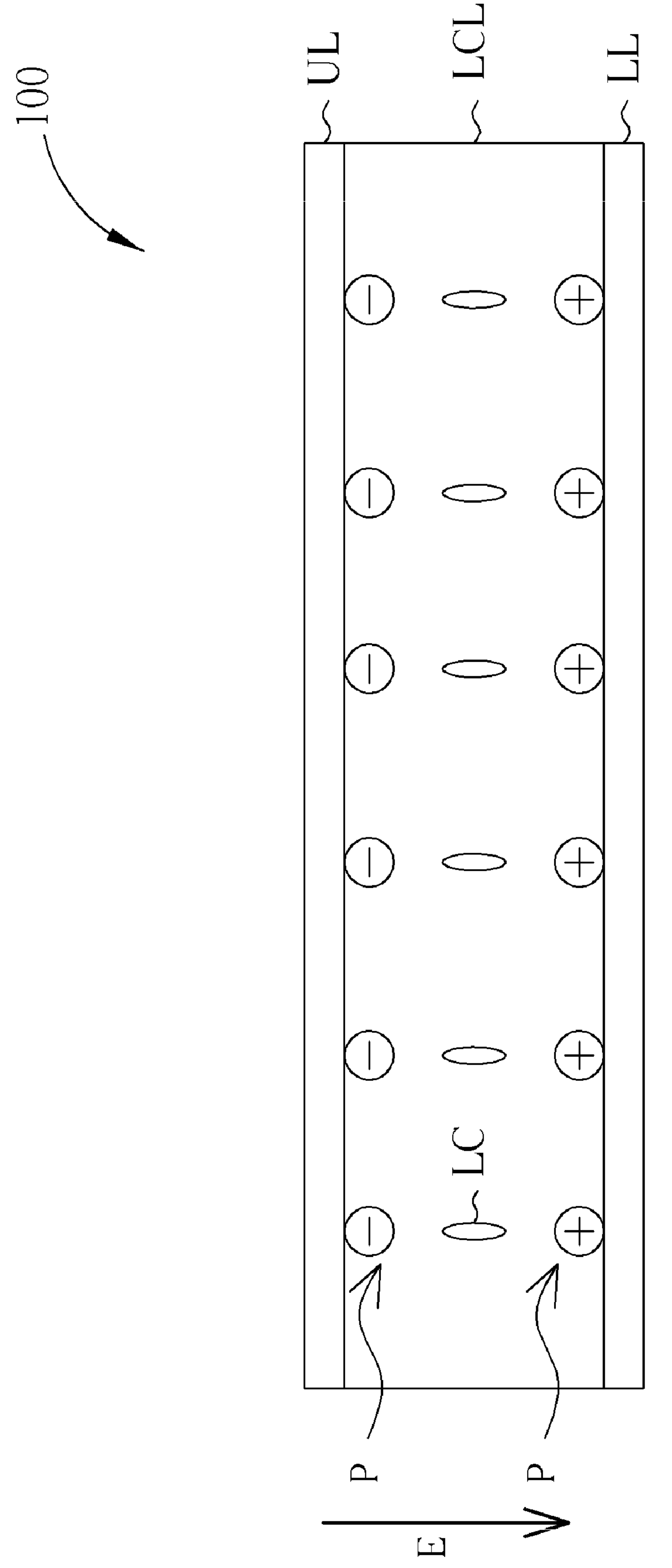
FIG. 3 PRIOR ART
FIG. 3 is a diagram of a conventional LCD after displaying the image for a period of time.
Figure 4:
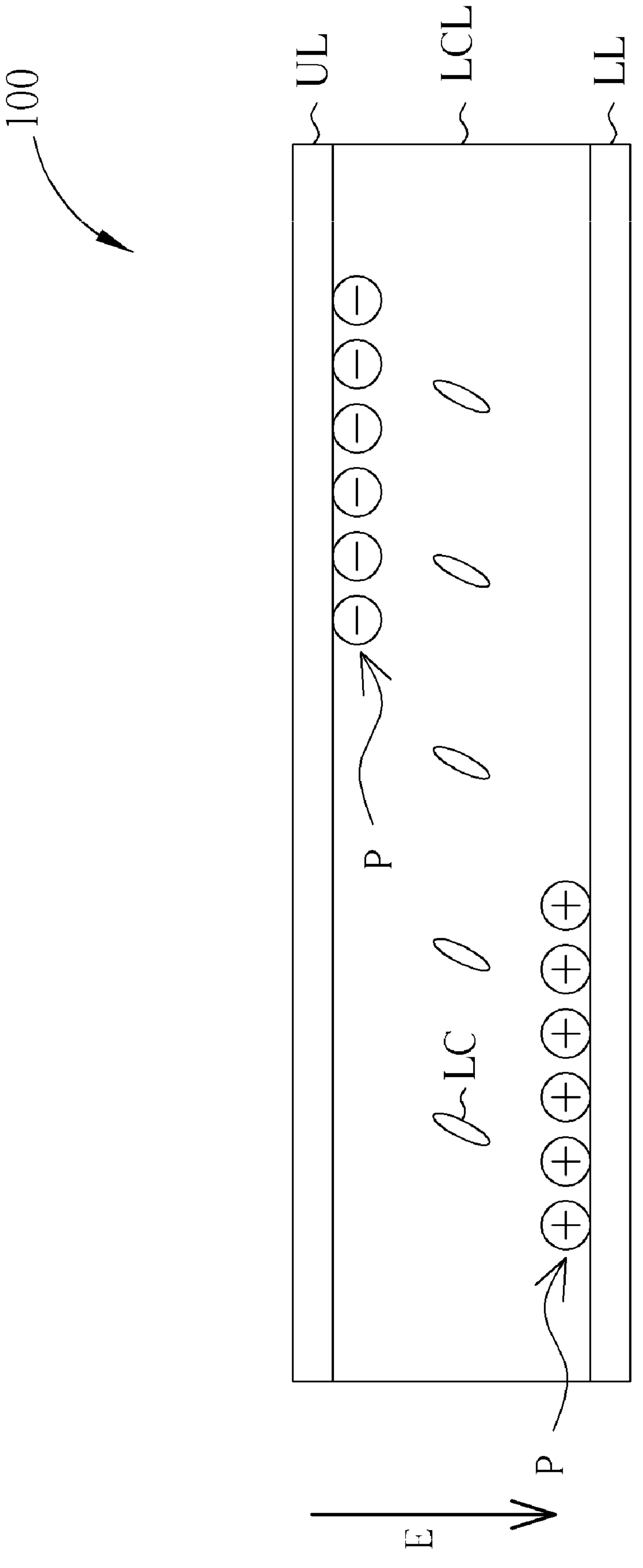
FIG. 4 PRIOR ART
FIG. 4 is another diagram of the conventional LCD after displaying the image for a period of time.
Figure 5:
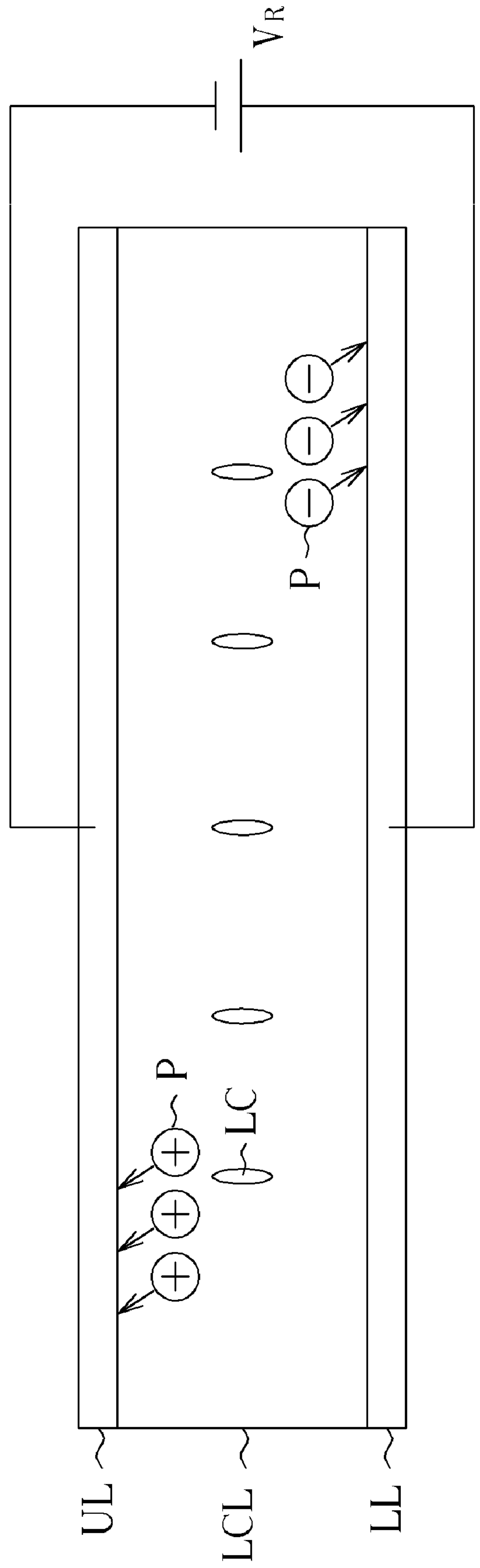
FIG. 5 is a diagram of applying a residual voltage to an LCD for reducing image sticking according to the present invention.

FIG. 5 is a diagram of applying a residual voltage to an LCD for reducing image sticking according to the present invention. As shown, the present invention adds a bias voltage VR across the upper layer UL and the lower layer LL. Thus, the impurities P in the liquid crystal layer LCL are attracted by the electric field generated by the bias voltage VR, and shift in the vertical direction. Thus, the line image sticking phenomenon caused by trapping of the impurities P after they shift in the horizontal direction is reduced.

Figure 6:
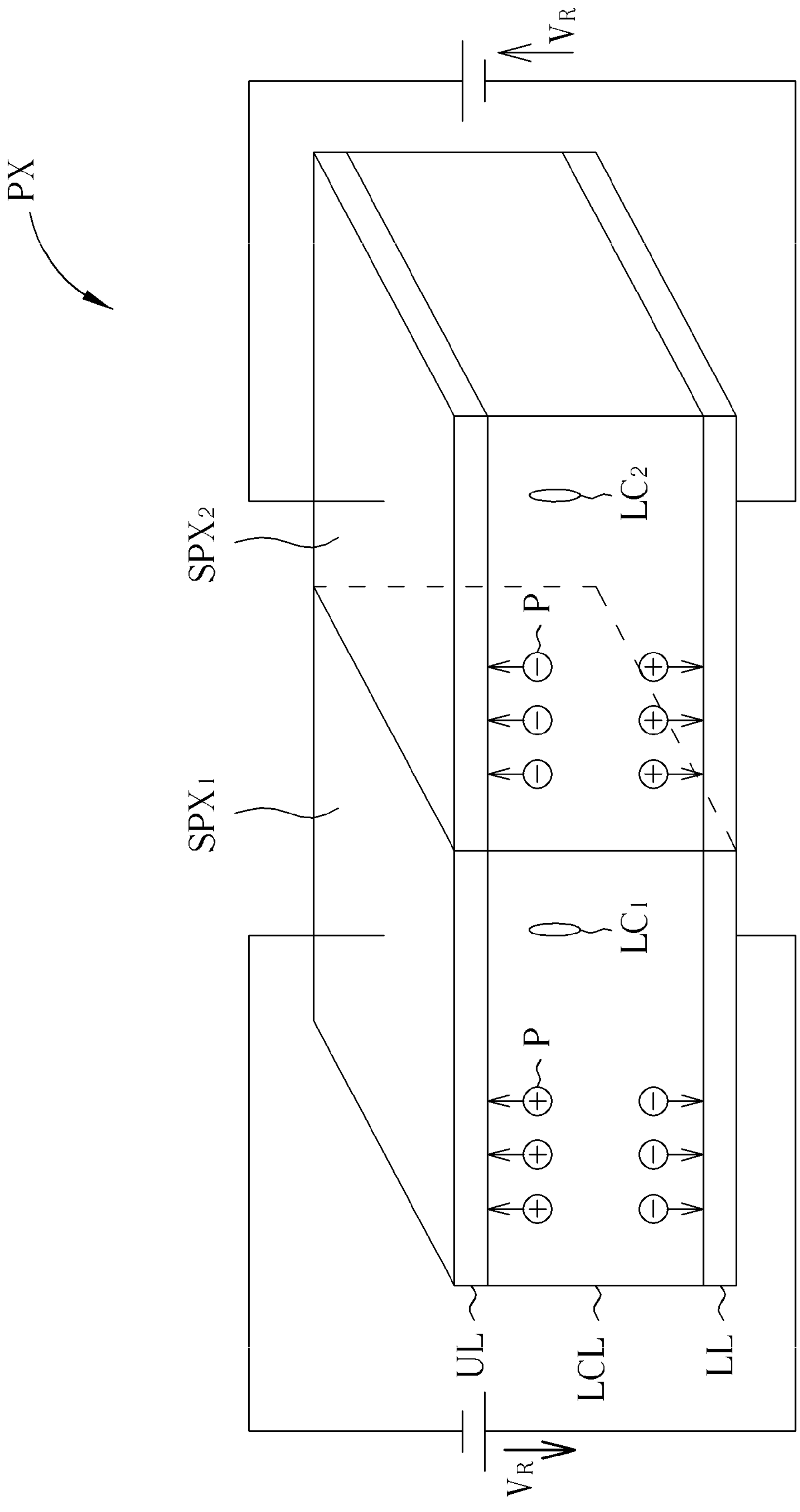
FIG. 6 is a diagram of applying a residual voltage to pixels for reducing image sticking according to the present invention.

FIG. 6 is a diagram of applying a residual voltage to pixels for reducing image sticking according to the present invention. As shown, a pixel PX may be separated into first and second subpixels SPX1 and SPX2, the bias voltage VR may be applied to the first subpixel SPX1, and a bias voltage −VR may be applied to the second subpixel SPX2. In this way, positively charged impurities P will shift up in the first subpixel SPX1, and positively charged impurities P will shift down in the second subpixel SPX2, thereby reducing shifting speed in the horizontal direction. Because the bias voltage applied to the first subpixel SPX1 is the voltage VR, and the bias voltage applied to the second subpixel SPX2 is the voltage −VR, the overall voltage applied to the pixel PX averages to 0, and no residual voltage will be left between the upper and lower layers. More specifically, if a pixel is a single pixel, the voltage VR or −VR applied will cause a non-uniform voltage drop across the LCD after repeatedly displaying positive and negative images, which will result in flicker. When a pixel is divided into two subpixels, although in this embodiment, the first subpixel SPX1 will be displayed more brightly, and the second subpixel SPX2 will be displayed more darkly, by setting a panel voltage appropriately between the voltages VR and −VR, such that bright and dark flashes of the first subpixel SPX1 and the second subpixel SPX2 are staggered and of the same level, equivalently no flicker will be generated. Simultaneously, the subpixels SPX1 and SPX2 are able to maintain the residual voltages VR and −VR, which will increase vertical mobility of the impurities P and correspondingly reduce horizontal mobility of the impurities P. In this way, the line image sticking problem may be reduced effectively.

Figure 7:
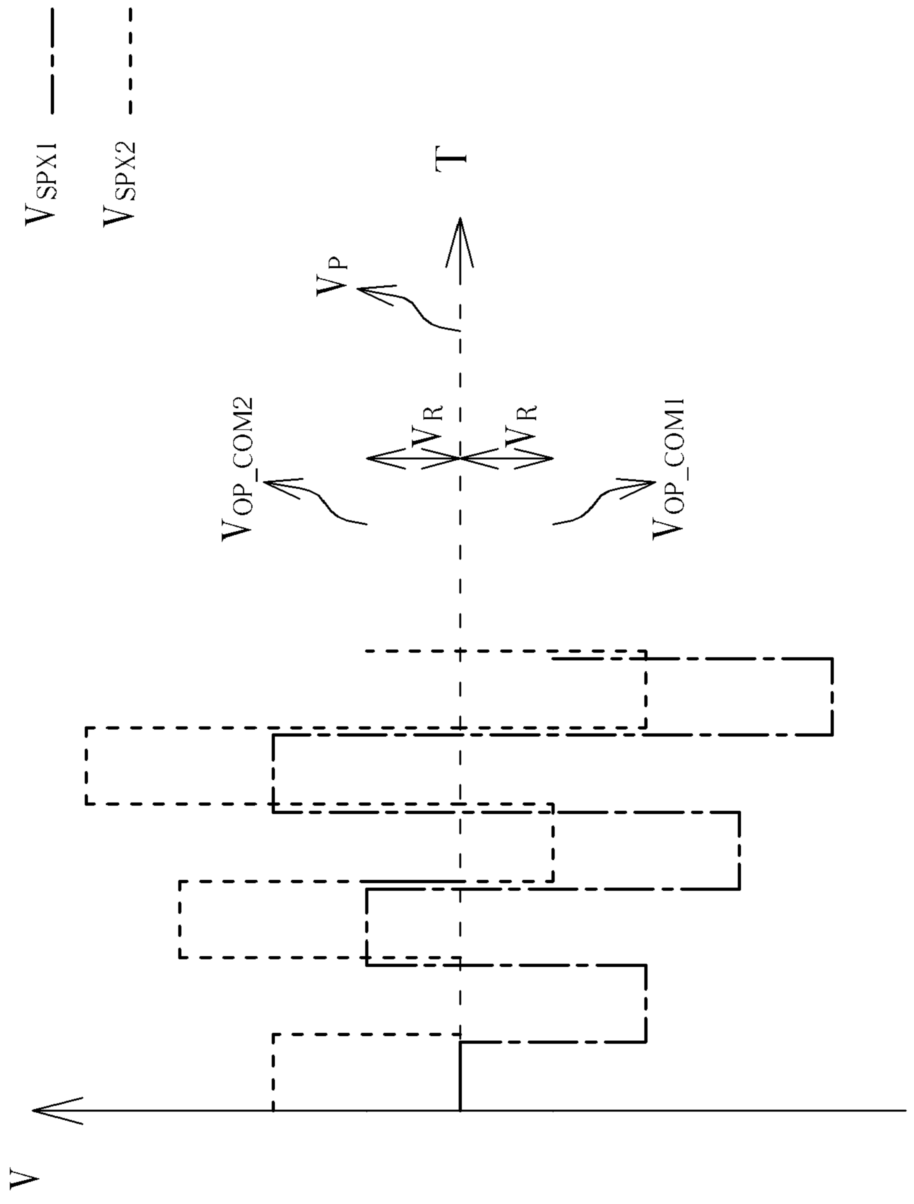
FIG. 7 is a diagram of driving a subpixel according to the method of FIG. 6.

FIG. 7 is a diagram of driving the subpixels SPX1 and SPX2 according to the method of FIG. 6. A voltage VSPX1 is a voltage for driving the first subpixel SPX1, and a voltage VSPX2 is a voltage for driving the second subpixel SPX2. It can be seen from FIG. 7 that the voltages VSPX1 and VSPX2 need to have inverse polarities and alternate from positive to negative according to the characteristics of the LCD. An average value of the voltage VSPX1 is a first optimized common voltage VOP_COM1, which has a voltage difference of −VR with the panel voltage VP. An average value of the voltage VSPX2 is a second optimized common voltage VOP_COM2, which has a voltage difference of VR with the panel voltage VP. In this embodiment, the panel voltage VP may be set to a value between the optimized common voltages VOP_COM1 and VOP_COM2, e.g. the average of the optimized common voltages VOP_COM1 and VOP_COM2, which is equal to the panel voltage VP.

Figure 8:
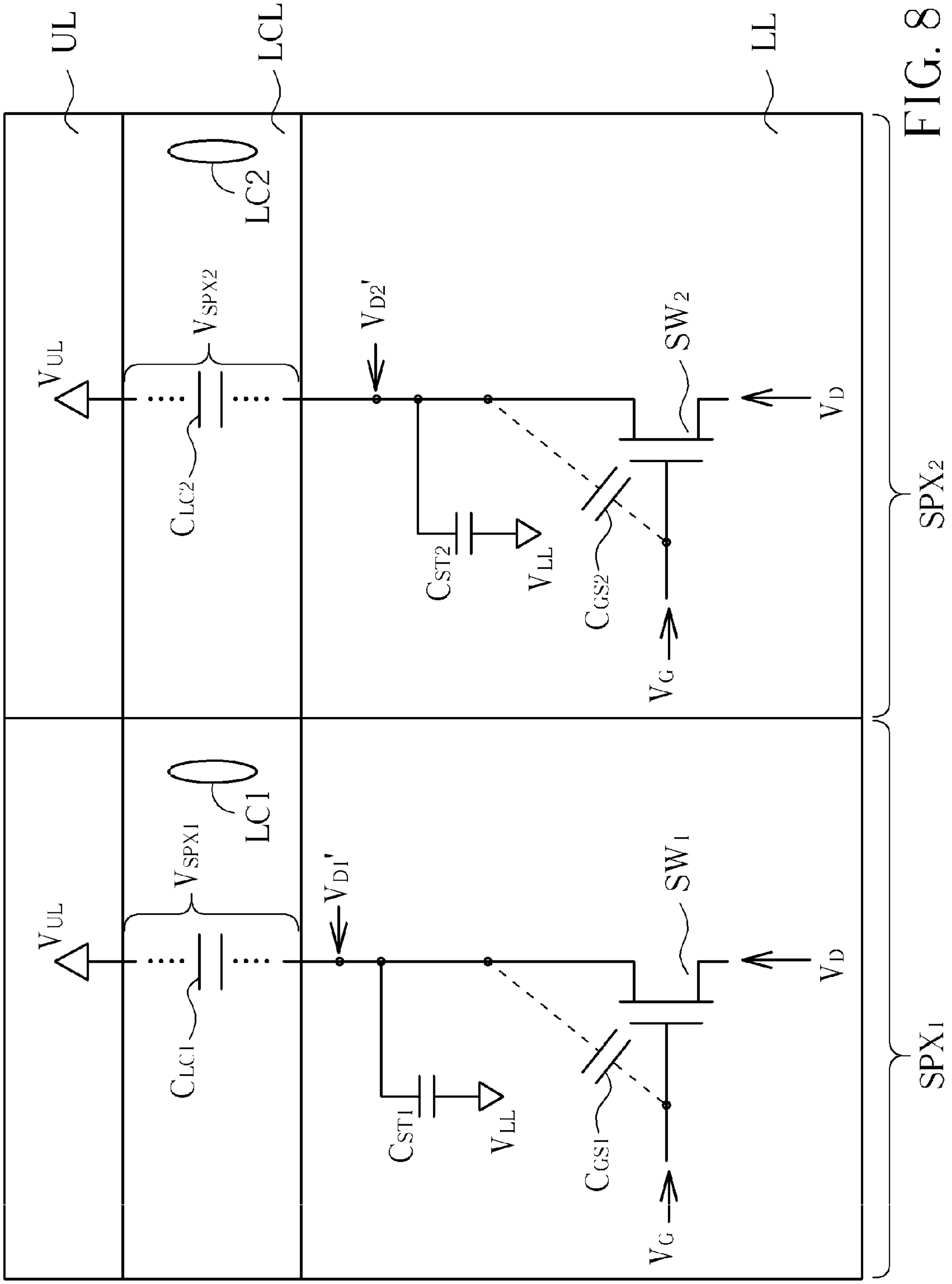
FIG. 8 is a diagram of a first embodiment of a circuit for utilizing the residual voltage according to the present invention.

FIG. 8 is a diagram of a first embodiment of a circuit for utilizing the residual voltage according to the present invention. The first subpixel SPX1 comprises a corresponding upper layer UL, liquid crystal layer LCL, and lower layer LL. The upper layer UL corresponding to the first subpixel SPX1 is coupled to an upper layer bias voltage terminal carrying a voltage VUL. A liquid crystal LC1 of the liquid crystal layer LCL corresponding to the first subpixel SPX1 has an equivalent capacitance CLC1. The lower layer LL corresponding to the first subpixel SPX1 comprises a switch SW1 and a storage capacitor CST1. The switch SW1 is utilized for transmitting a gray level voltage VD to the liquid crystal layer LCL according to a voltage VG on a control end of the switch SW1 for providing a driving voltage to the liquid crystal LC1. The switch SW1 further comprises a parasitic capacitor CGS1. One end of the storage capacitor CST1 is coupled to a lower layer bias voltage terminal carrying a voltage VLL. Another end of the storage capacitor CST1 is coupled to an end of the switch SW1 for storing a conducting voltage VD1'. The voltage VD1' is used for driving the liquid crystal LC1 to turn. Because the voltage VD1' has a feed through voltage VFT1, the voltage VD1' differs slightly from the gray level voltage VD ($VD1' = VD - VFT1$), and the feed through voltage VFT1 is directly proportional to the ratio $CGS1/(CST1+CLC1)$. The second subpixel SPX2 comprises a corresponding upper layer UL, liquid crystal layer LCL, and lower layer LL. The upper layer UL corresponding to the second subpixel SPX2 is coupled to an upper layer bias voltage terminal carrying a voltage VUL. A liquid crystal LC2 of the liquid crystal layer LCL corresponding to the second subpixel SPX2 has an equivalent capacitance CLC2. The lower layer LL corresponding to the second subpixel SPX2 comprises a switch SW2 and a storage capacitor CST2. The switch SW2 is utilized for transmitting a gray level voltage VD to the liquid crystal layer LCL according to a voltage VG on a control end of the switch SW2 for providing a driving voltage to the liquid crystal LC2. The switch SW2 further comprises a parasitic capacitor CGS2. One end of the storage capacitor CST2 is coupled to a lower layer bias voltage terminal carrying a voltage VLL. Another end of the storage capacitor CST2 is coupled to an end of the switch SW2 for storing a conducting voltage VD2'. The voltage VD2' is used for driving the liquid crystal LC2 to turn. Because the voltage VD2' has a feed through voltage VFT2, the voltage VD2' differs slightly from the gray level voltage VD ($VD2' = VD - VFT2$). The feed through voltage VFT1 is directly proportional to the ratio $CGS2/(CST1+CLC1)$. Thus, the amplitudes of the feed through voltages VFT1 and VFT2 can be adjusted to make the voltages VD1' and VD2' that ultimately drive the liquid crystals LC1 and LC2 different, so as to achieve the residual voltage effect shown in FIG. 7. The feed through voltage VFT may be most easily adjusted by adjusting the storage capacitor CST. Thus, by setting different capacitances for the storage capacitors CST1 and CST2 of the subpixels SPX1 and SPX2, the feed through voltages VFT1 and VFT2 may be different, making the voltages VD1' and VD2' different. The voltage VSPX1 across the equivalent capacitor CLC1 of the liquid crystal LC1 is $VD1' - VUL$. By setting the voltage VUL to 0, the voltage VSPX1 becomes VD1'. The voltage VSPX2 across the equivalent capacitor CLC2 of the liquid crystal LC2 is $VD2' - VUL$. By setting the voltage VUL to 0, the voltage VSPX2 becomes VD2'. Further, the upper layer common voltage VUL and the lower layer common voltage VLL are both the same as the panel voltage VP in FIG. 8.

Figure 9:
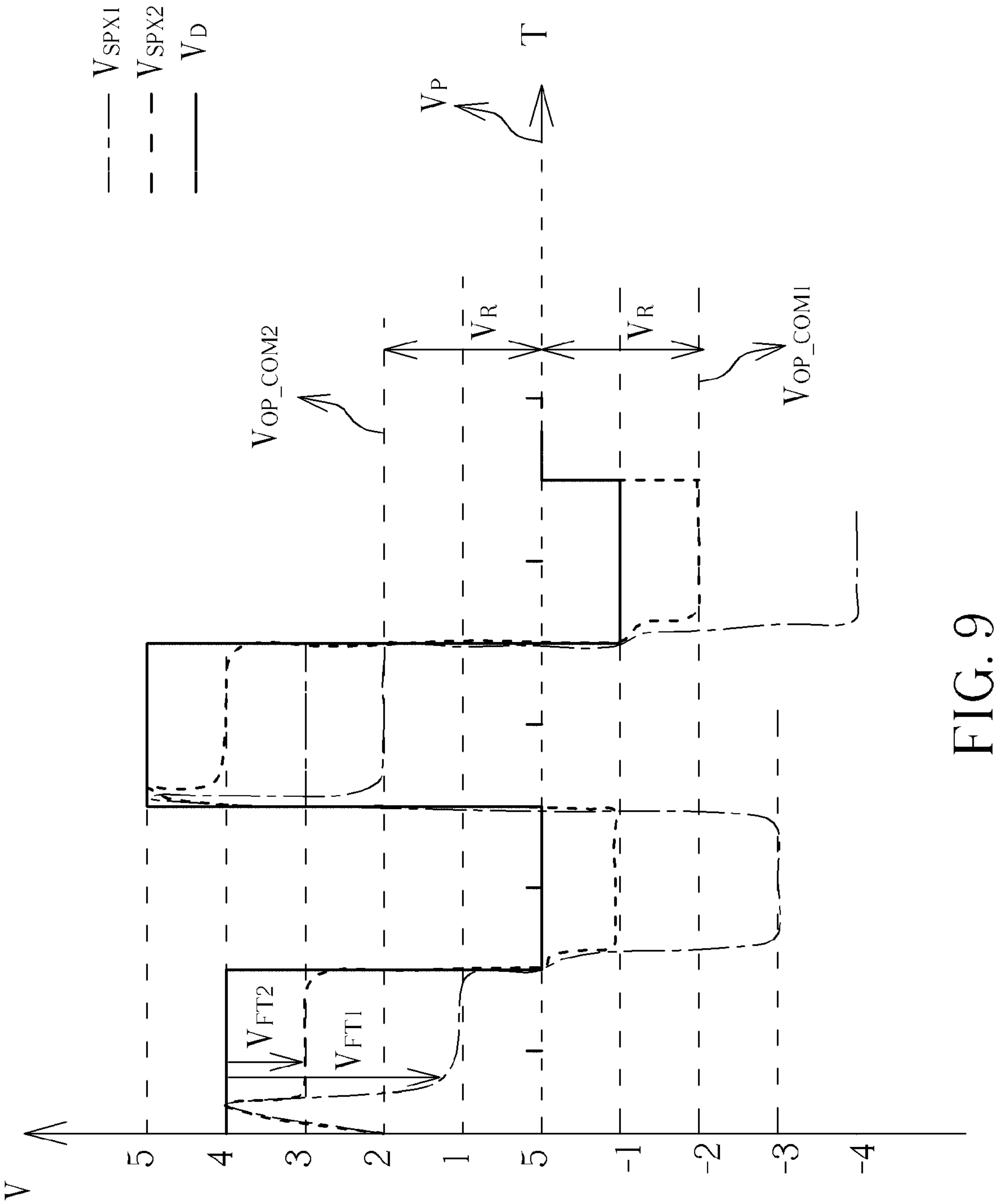
FIG. 9 is a timing diagram according to the embodiment of FIG. 8.

FIG. 9 is a timing diagram according to the embodiment of FIG. 8. As shown, the gray level voltage VD simultaneously drives the subpixels SPX1 and SPX2. Because the subpixels SPX1 and SPX2 each have different feed through voltages VFT1 and VFT2, the voltage ultimately received by the liquid crystal LC1 of the subpixel SPX1 will be the voltage VSPX1 shown in the figure. The voltage ultimately received by the liquid crystal LC2 of the subpixel SPX2 will be the voltage VSPX2 shown in the figure. The average value of the voltage VSPX1 will be equal to the optimized common voltage VOP_COM1, which is lower than the panel voltage VP (set to 0V) by the voltage VR. The average value of the voltage VSPX2 will be equal to the optimized common voltage VOP_COM2, which is higher than the panel voltage VP (set to 0V) by the voltage VR. As described above, in this way, the subpixel SPX2 will be brighter, and the subpixel SPX1 will be darker. However, if the panel voltage VP is set appropriately between the optimized common voltages VOP_COM1 and VOP_COM2, namely between the voltages VR and −VR, the brightness of the first subpixel SPX1 and the darkness of the second subpixel SPX2 can be timed to overlap with the same amplitude (in this embodiment, the panel voltage VP is set to the average value of 0 between the voltages VR and −VR), such that, equivalently, no flickering will be generated, and the subpixels SPX1 and SPX2 may maintain the residual voltages VR and −VR. This increases the vertical mobility of the impurities P and correspondingly decreases the horizontal mobility of the impurities P, which effectively reduces the line image sticking problem.

Figure 10:
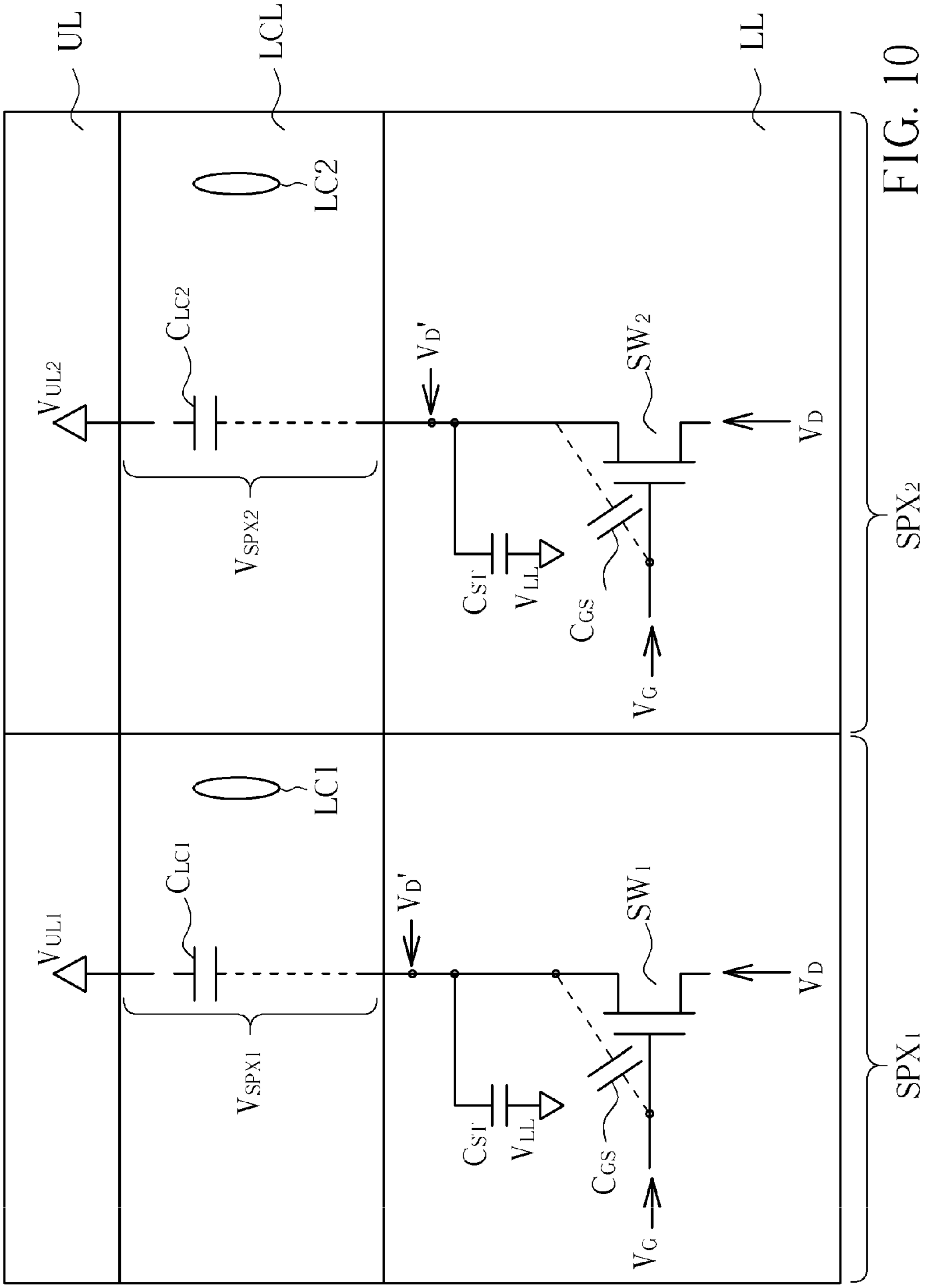
FIG. 10 is a diagram of a second embodiment of the circuit for utilizing the residual voltage according to the present invention.

FIG. 10 is a diagram of a second embodiment of the circuit for utilizing the residual voltage according to the present invention. The first subpixel SPX1 comprises a corresponding upper layer UL, liquid crystal layer LCL, and lower layer LL. The upper layer UL corresponding to the subpixel SPX1 is coupled to a bias voltage terminal carrying a voltage VUL1 (upper layer common voltage). The liquid crystal of the liquid crystal layer LCL corresponding to the subpixel SPX1 has an equivalent capacitance CLC1. The lower layer LL corresponding to the subpixel SPX1 comprises a switch SW1 and a storage capacitor CST. The switch SW1 is utilized for transmitting a gray level voltage VD to the liquid crystal layer LCL according to a voltage VG on a control end of the switch SW1 for providing a driving voltage to the liquid crystal LC1. The switch SW1 further comprises a parasitic capacitor CGS. One end of the storage capacitor CST is coupled to a lower layer bias voltage terminal carrying a voltage VLL. Another end of the storage capacitor CST is coupled to an end of the switch SW1 for storing a conducting voltage VD'. The voltage VD' is used for driving the liquid crystal LC1 to turn. Because the voltage VD' has a feed through voltage VFT, the voltage VD1' differs slightly from the gray level voltage VD (VD'=VD−VFT). The second subpixel SPX2 comprises a corresponding upper layer UL, liquid crystal layer LCL, and lower layer LL. The upper layer UL corresponding to the subpixel SPX2 is coupled to a bias voltage terminal carrying a voltage VUL2 (upper layer common voltage). The liquid crystal of the liquid crystal layer LCL corresponding to the subpixel SPX2 has an equivalent capacitance CLC2. The lower layer LL corresponding to the subpixel SPX2 comprises a switch SW2 and a storage capacitor CST. The switch SW2 is utilized for transmitting a gray level voltage VD to the liquid crystal layer LCL according to a voltage VG on a control end of the switch SW2 for providing a driving voltage to the liquid crystal LC2. The switch SW2 further comprises a parasitic capacitor CGS. One end of the storage capacitor CST is coupled to a lower layer bias voltage terminal carrying a voltage VLL. Another end of the storage capacitor CST is coupled to an end of the switch SW2 for storing a conducting voltage VD'. The voltage VD' is used for driving the liquid crystal LC2 to turn. Because the voltage VD' has a feed through voltage VFT, the voltage VD' differs slightly from the gray level voltage VD (VD'=VD−VFT). The voltage VSPX1 across the equivalent capacitance CLC1 of the liquid crystal LC1 equals VD'−VUL1. The voltage VSPX2 across the equivalent capacitance CLC2 of the liquid crystal LC2 equals VD'−VUL2. Thus, by changing the amplitudes of the voltages VUL1 and VUL2, the voltages VSPX1 and VSPX2 ultimately driving the liquid crystals LC1 and LC2 can be made different, so as to achieve the residual voltage effect shown in FIG. 7.

Figure 11:
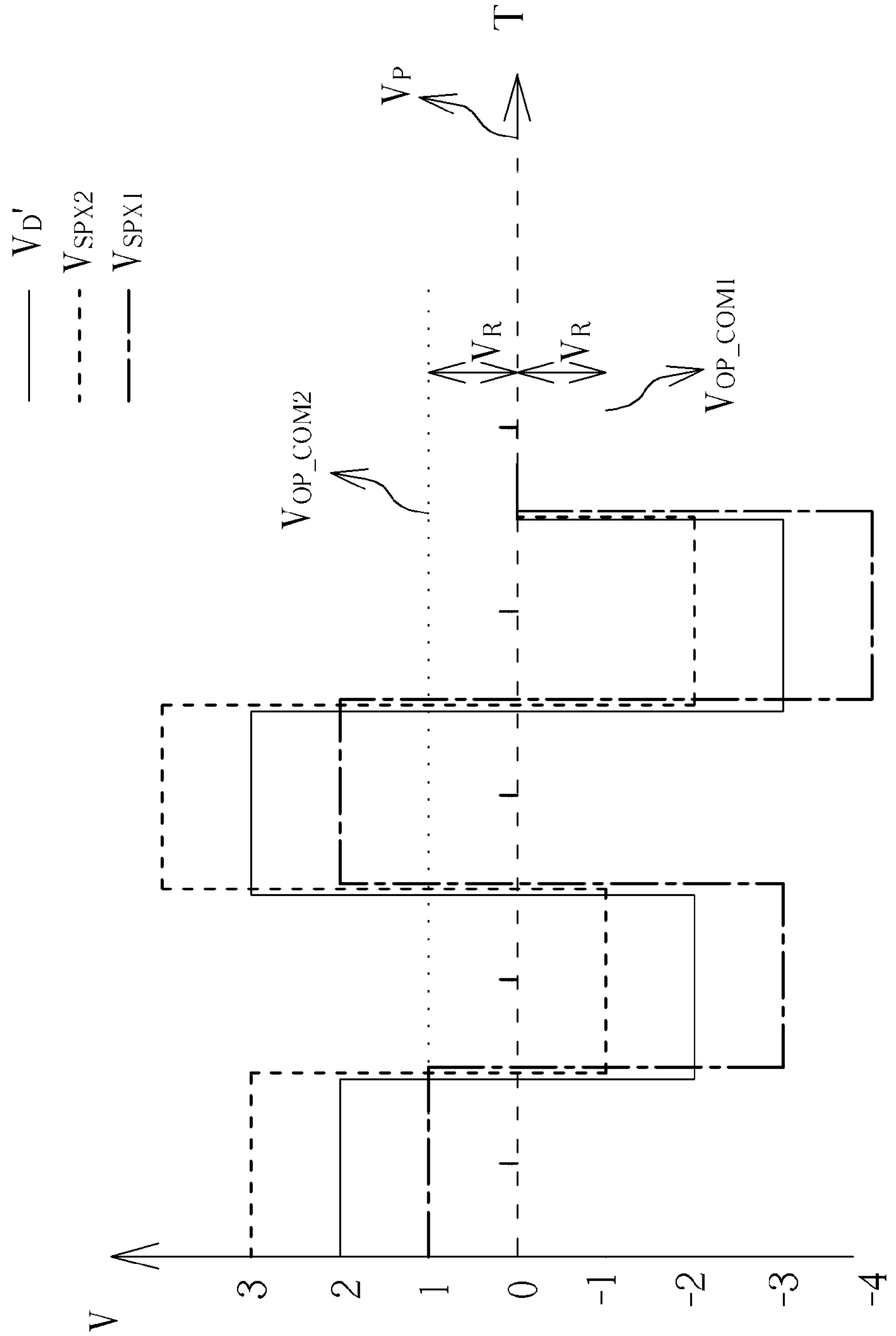
FIG. 11 is a timing diagram according to the embodiment of FIG. 10.

FIG. 11 is a timing diagram according to the embodiment of FIG. 10. As shown, the gray level voltage VD simultaneously drives the subpixels SPX1 and SPX2. Because the subpixels SPX1 and SPX2 have different upper layer voltages VUL1 and VUL2, the ultimate voltage received by the liquid crystal LC1 of the subpixel SPX1 will be the voltage VSPX1 shown in FIG. 11, and the ultimate voltage received by the liquid crystal LC2 of the subpixel SPX2 will be the voltage VSPX2 shown in FIG. 11. For example, when the voltage VD' is 2V, the upper voltage VUL1 is 1V, and the subpixel voltage VSPX1 is 1V (VD'−VUL1=2−1=1). When the upper panel voltage is −1 V, the subpixel voltage VSPX2 is 3V (VD'−VUL2=2−(−1)=3), and so forth. The average value of the voltage VSPX1 will equal the optimized common voltage VOP_COM1 (−1V as shown), which is lower than the panel voltage VP by the voltage VR. The average value of the voltage VSPX2 will equal the optimized common voltage VOP_COM2 (1V as shown), which is higher than the panel voltage VP (set to 0V) by the voltage VR (1V). As described above, in this way, the subpixel SPX2 will be brighter, and the subpixel SPX1 will be darker. However, if the panel voltage VP is set appropriately between the optimized common voltages VOP_COM1 and VOP_COM2, namely between the voltages VR and −VR, the brightness of the first subpixel SPX1 and the darkness of the second subpixel SPX2 can be timed to overlap with the same amplitude (in this embodiment, the panel voltage VP is set to the average value of 0 between the voltages VR and −VR), such that, equivalently, no flickering will be generated, and the subpixels SPX1 and SPX2 may maintain the residual voltages VR and −VR. This increases the vertical mobility of the impurities P and correspondingly decreases the horizontal mobility of the impurities P, which effectively reduces the line image sticking problem.

Figure 12:
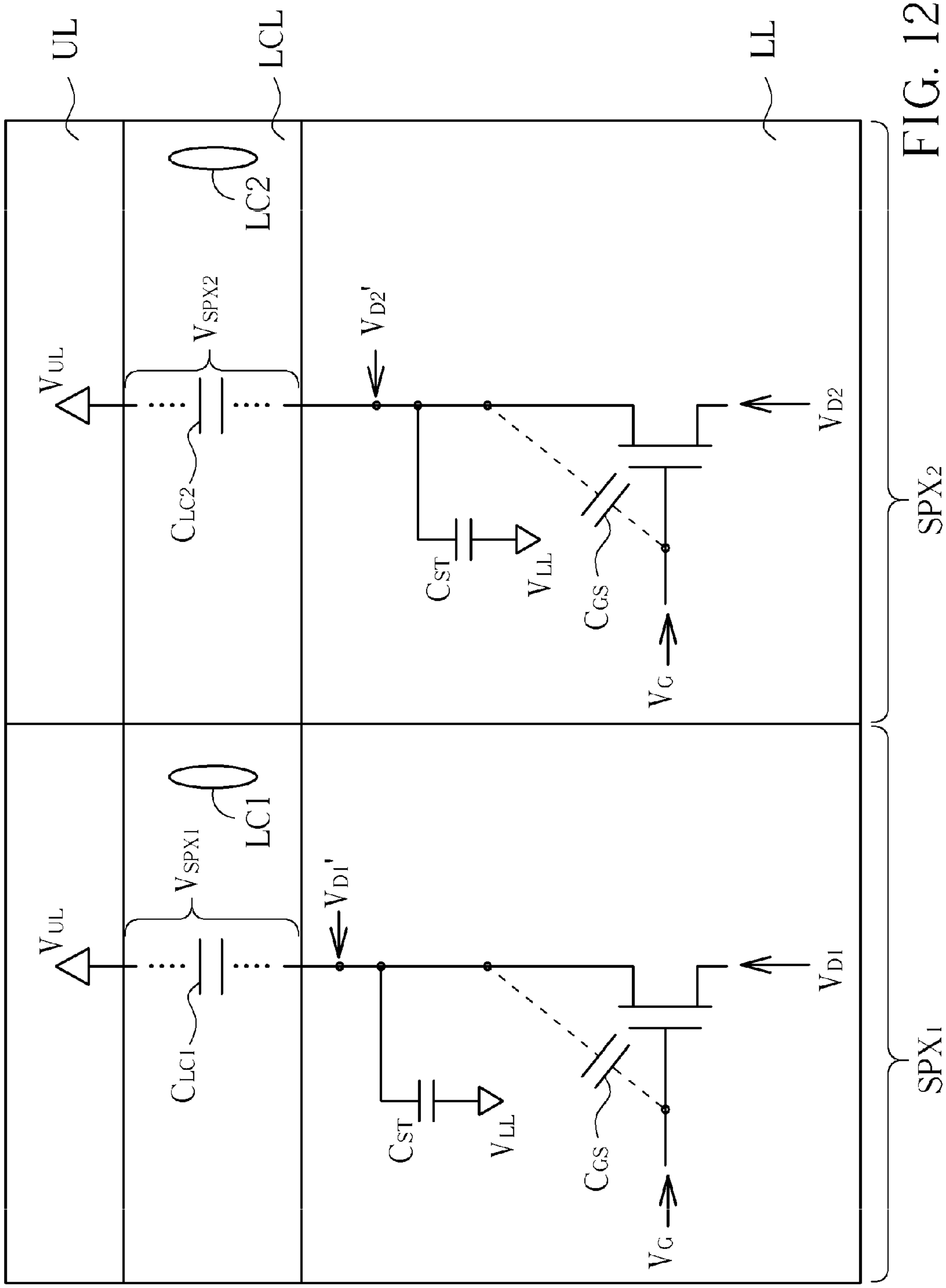
FIG. 12 is a diagram of a third embodiment of the circuit for utilizing the residual voltage according to the present invention.

FIG. 12 is a diagram of a third embodiment of the circuit for utilizing the residual voltage according to the present invention. The first subpixel SPX1 comprises a corresponding upper layer UL, liquid crystal layer LCL, and lower layer LL. The upper layer UL corresponding to the subpixel SPX1 is coupled to a bias voltage terminal carrying a voltage VUL (upper layer common voltage). The liquid crystal of the liquid crystal layer LCL corresponding to the subpixel SPX1 has an equivalent capacitance CLC1. The lower layer LL corresponding to the subpixel SPX1 comprises a switch SW1 and a storage capacitor CST. The switch SW1 is utilized for transmitting a gray level voltage VD1 to the liquid crystal layer LCL according to a voltage VG on a control end of the switch SW1 for providing a driving voltage to the liquid crystal LC1. The switch SW1 further comprises a parasitic capacitor CGS. One end of the storage capacitor CST is coupled to a lower layer bias voltage terminal carrying a voltage VLL. Another end of the storage capacitor CST is coupled to an end of the switch SW1 for storing a conducting voltage VD1'. The voltage VD1' is used for driving the liquid crystal LC1 to turn. Because the voltage VD1' has a feed through voltage VFT, the voltage VD1' differs slightly from the gray level voltage VD1 (VD1'=VD1−VFT). The second subpixel SPX2 comprises a corresponding upper layer UL, liquid crystal layer LCL, and lower layer LL. The upper layer UL corresponding to the subpixel SPX2 is coupled to a bias voltage terminal carrying a voltage VUL (upper layer common voltage). The liquid crystal of the liquid crystal layer LCL corresponding to the subpixel SPX2 has an equivalent capacitance CLC2. The lower layer LL corresponding to the subpixel SPX2 comprises a switch SW2 and a storage capacitor CST. The switch SW2 is utilized for transmitting a gray level voltage VD to the liquid crystal layer LCL according to a voltage VG on a control end of the switch SW2 for providing a driving voltage to the liquid crystal LC2. The switch SW2 further comprises a parasitic capacitor CGS. One end of the storage capacitor CST is coupled to a lower layer bias voltage terminal carrying a voltage VLL. Another end of the storage capacitor CST is coupled to an end of the switch SW2 for storing a conducting voltage VD2'. The voltage VD2' is used for driving the liquid crystal LC2 to turn. Because the voltage VD2' has a feed through voltage VFT, the voltage VD2' differs slightly from the gray level voltage VD (VD2'=VD−VFT). The voltage across the equivalent capacitance CLC1 of the liquid crystal LC1 equals VD1'−VUL, and the voltage across the equivalent capacitance CLC2 of the liquid crystal LC2 equals VD2'−VUL. Thus, by changing the amplitudes of the gray level voltages VD1 and VD2, the voltages VSPX1 and VSPX2 ultimately driving the liquid crystals LC1 and LC2 can be made different, such that the residual voltage effect of FIG. 7 can be achieved.

Figure 13:
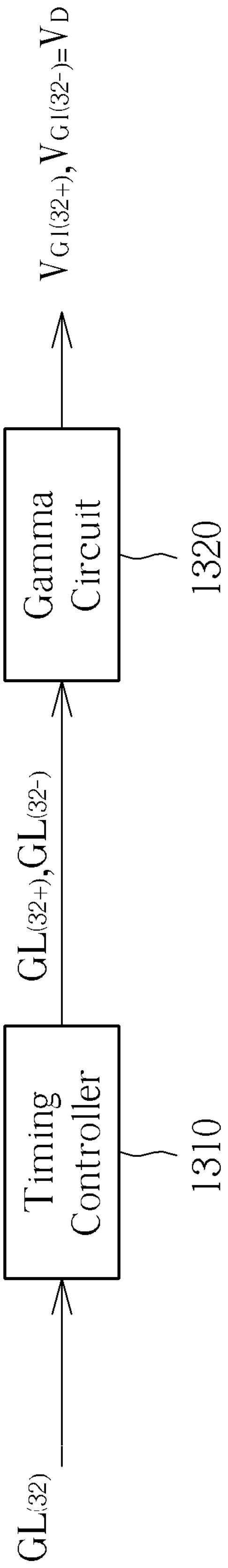
FIG. 13 PRIOR ART
FIG. 13 is a diagram of converting gray level data to a gray level voltage according to the prior art.

FIG. 13 is a diagram of converting gray level data to a gray level voltage according to the prior art. As shown in FIG. 13, a gray level GL (for example, the $32^{nd}$ gray level, namely GL(32)) is converted to a positive gray level GL(32+) and a negative gray level (32−) by a timing controller 1310 according to a gray level to gray level conversion characteristic. Then, the positive gray level and the negative gray level are converted to gray level voltages VG1(32+) and VG1(32−) through a gamma circuit 1320 according to a gray level to voltage conversion characteristic (gamma curve), to be sent as the gray level voltage VD to the pixels. The gray level to voltage conversion characteristic (gamma curve) of the gamma circuit 1320 may be gamma 1.8, gamma 2.2, etc.

Figure 14:
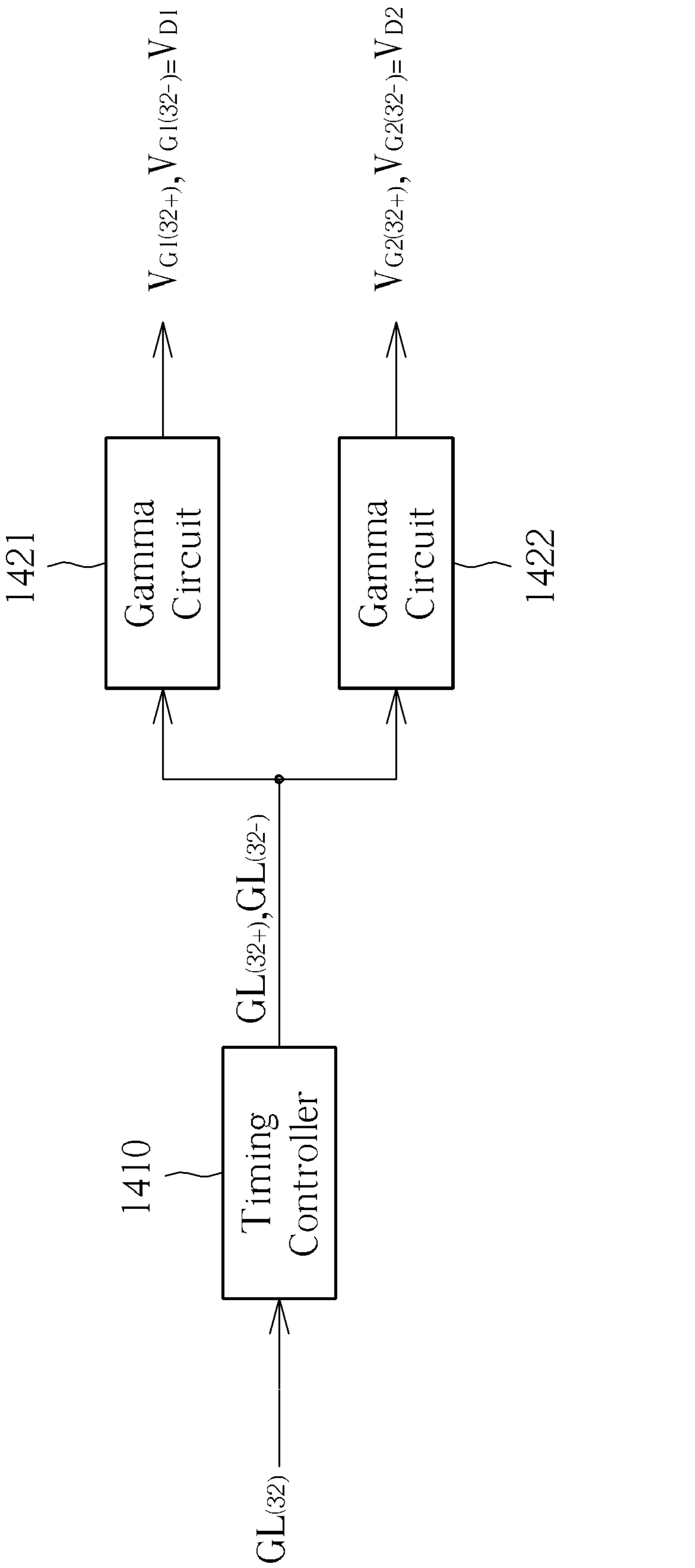
FIG. 14 is a circuit diagram according to the third embodiment of the present invention.

FIG. 14 is a circuit diagram according to the third embodiment of the present invention. FIG. 14 is different from FIG. 13 due to two gamma circuits 1421 and 1422, which have two different gamma curves respectively. Thus, a gray level GL, such as the $32^{nd}$ gray level, namely GL(32), is converted into the positive gray level GL(32+) and the negative gray level GL(32−) by a timing controller 1410 according a gray level to gray level conversion characteristic, then converted to gray level voltages VG1(32+) and VG1(32−) and gray level voltages VG2(32+) and VG2(32−) by the gamma circuits 1421 and 1422, respectively, to act as the gray level voltages VD1 and VD2 sent to the subpixels SPX1 and SPX2. The average value of the gray level voltages VG1(32+) and VG1(32−) outputted by the gamma circuit 1421 matches the optimized common voltage VOP_COM1 (set to −VR), and the average value of the gray level voltages VG2(32+) and VG2(32−) outputted by the gamma circuit 1422 match the optimized common voltage VOP_COM2 (set as VR). As described above, in this way, the subpixel SPX2 will be brighter, and the subpixel SPX1 will be darker. However, if the panel voltage VP is set appropriately between the optimized common voltages VOP_COM1 and VOP_COM2, namely between the voltages VR and −VR, the brightness of the first subpixel SPX1 and the darkness of the second subpixel SPX2 can be timed to overlap with the same amplitude (in this embodiment, the panel voltage VP is set to the average value of 0 between the voltages VR and −VR), such that, equivalently, no flickering will be generated, and the subpixels SPX1 and SPX2 may maintain the residual voltages VR and −VR. This increases the vertical mobility of the impurities P and correspondingly decreases the horizontal mobility of the impurities P, which effectively reduces the line image sticking problem.

Figure 15:
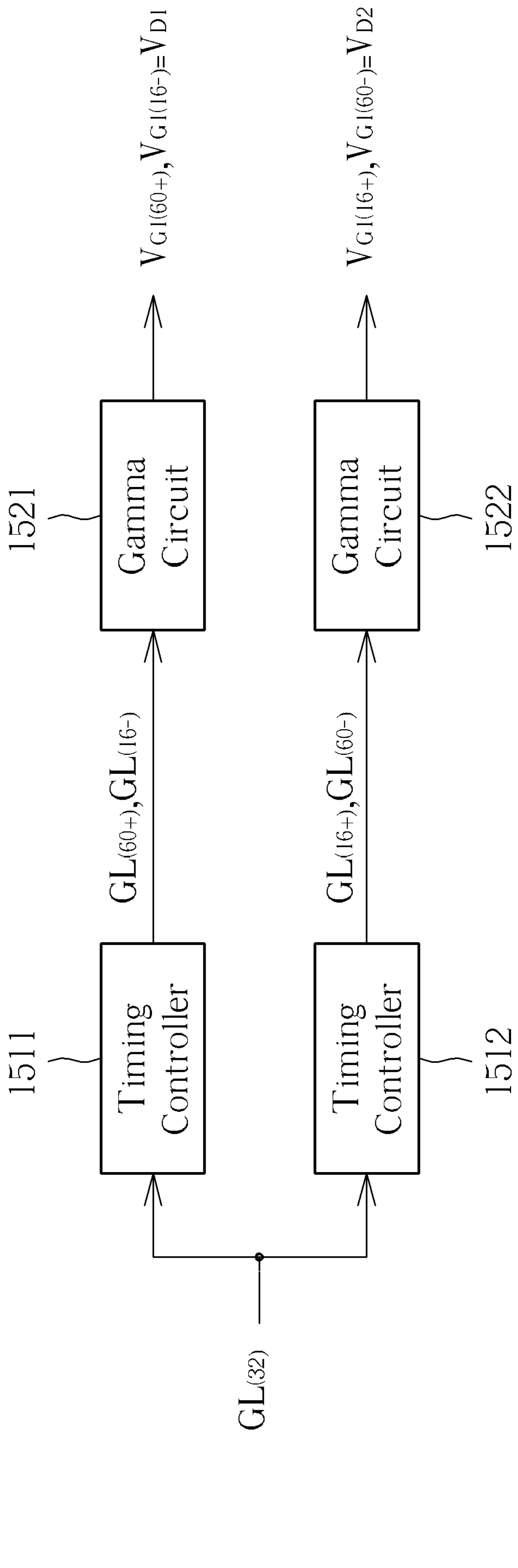
FIG. 15 is another circuit diagram according to the third embodiment of the present invention.

FIG. 15 is another circuit diagram according to the third embodiment of the present invention. FIG. 15 is different from FIG. 13 due to two timing controllers 1511, 1512 and corresponding gamma circuits 1521, 1522. The gamma circuits 1521 and 1522 have the same gamma curves. Thus, a gray level GL, e.g. the $32^{nd}$ gray level, namely GL(32), may be converted to a positive gray level GL(60+) and a negative gray level GL(16−) and a positive gray level GL(16+) and a negative gray level GL(60−) by the timing controllers 1511, 1512 according to a first gray level to gray level conversion characteristic and a second gray level to gray level conversion characteristic, then converted to gray level voltages VG1 (60+) and VG1(16−) and gray level voltages VG1(16+) and VG1(60−) to act as the gray level voltages VD1 and VD2 sent to the subpixels SPX1 and SPX2, respectively. The first gray level to gray level conversion characteristic and the second gray level to gray level conversion characteristic are different. The average value of the gray level voltages VG1(60+) and VG1(16−) converted by the timing controllers and the gamma circuits matches the optimized common voltage VOP_COM1 (set to −VR), and the average value of the gray level voltages VG1(16+) and VG1(60−) converted by the timing controllers and the gamma circuits matches the optimized common voltage VOP_COM2 (set to VR). As described above, in this way, the subpixel SPX2 will be brighter, and the subpixel SPX1 will be darker. However, if the panel voltage VP is set appropriately between the optimized common voltages VOP_COM1 and VOP_COM2, namely between the voltages VR and −VR, the brightness of the first subpixel SPX1 and the darkness of the second subpixel SPX2 can be timed to overlap with the same amplitude (in this embodiment, the panel voltage VP is set to the average value of 0 between the voltages VR and −VR), such that, equivalently, no flickering will be generated, and the subpixels SPX1 and SPX2 may maintain the residual voltages VR and −VR. This increases the vertical mobility of the impurities P and correspondingly decreases the horizontal mobility of the impurities P, which effectively reduces the line image sticking problem.

Figure 16:
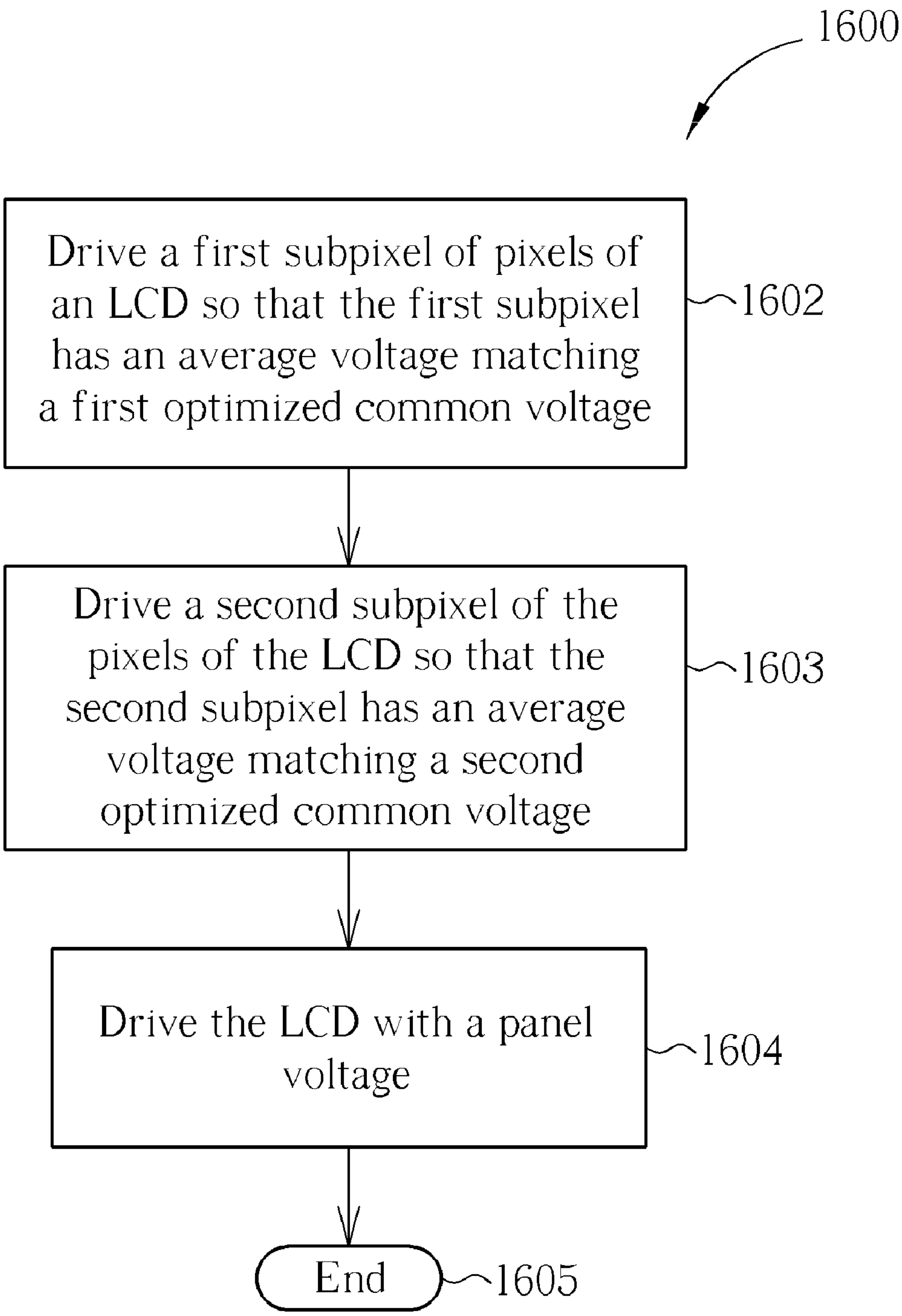
FIG. 16 is a flowchart of a process for utilizing a residual voltage to reduce line image sticking according to the present invention.

FIG. 16 is a flowchart of a process 1600 for utilizing a residual voltage to reduce line image sticking according to the present invention. According to the three embodiments described above, the following steps shown in FIG. 16 can be induced:

Step 1602: Drive a first subpixel SPX1 of a pixel PX so that an average value of a voltage VSPX1 carried by the first subpixel SPX1 matches a first optimized common voltage VOP_COM1.

Step 1603: Drive a second subpixel SPX2 of the pixel PX so that an average value of a voltage VSPX2 carried by the second subpixel SPX2 matches a second optimized common voltage VOP_COM2.

Step 1604: Drive the LCD with a panel voltage VP, wherein the panel voltage VP is between the first optimized common voltage VOP_COM1 and the second optimized common voltage VOP_COM2.

Step 1605: End.

In Step 1604, an average of the optimized common voltages VOP_COM1 and VOP_COM2 is equal to the panel voltage VP.

In Steps 1602 and 1603, according to the first embodiment of the present invention, the first subpixel SPX1 and the second subpixel SPX2 may be driven by a driving voltage VD having an average value matching the panel voltage. Then, the average values of the voltages VSPX1 and VSPX2 across the equivalent capacitances CST1, CST2 of the first subpixel SPX1 and the second subpixel SPX2 may be individually adjusted to match the first optimized common voltage VOP_ COM1 and the second optimized common voltage VOP_ COM2, respectively.

In Steps 1602 and 1603, according to the second embodiment of the present invention, the first subpixel SPX1 and the second subpixel SPX2 may be driven by a driving voltage VD having an average value matching the panel voltage. Then, the upper panel voltages VUL1 and VUL2 of the first subpixel SPX1 and the second subpixel SPX2 may be individually adjusted to make the average values of the voltages VSPX1 and VSPX2 match the first optimized common voltage VOP_ COM1 and the second optimized common voltage VOP_ COM2, respectively.

In Steps 1602 and 1603, according to the third embodiment of the present invention and the method disclosed in FIG. 14, the first subpixel SPX1 and the second subpixel SPX2 may be driven by a driving voltage VD1 having an average value matching the first optimized common voltage VOP_COM1 and a driving voltage VD2 having an average value matching the second optimized common voltage VOP_COM2, respectively. The driving voltage VD1 having the average value matching the first optimized common voltage VOP_COM1 may be generated according to a first gray level to voltage conversion characteristic, whereby a gray level GL(32) may be converted to first gray level voltages VG1(32+), VG1 (32−). The driving voltage VD2 having the average value matching the second optimized common voltage VOP_ COM2 may be generated according to a second gray level to voltage conversion characteristic, whereby the gray level GL(32) may be converted to second gray level voltages VG2 (32+), VG2(32−). The upper panel voltages VUL1 and VUL2 of the first subpixel SPX1 and the second subpixel SPX2 may be kept the same. In this way, the average values of the voltages VSPX1 and VSPX2 may match the first optimized common voltage VOP_COM1 and the second optimized common voltage VOP_COM2, respectively.

In Steps 1602 and 1603, according to the third embodiment of the present invention and the method disclosed in FIG. 15, the first subpixel SPX1 and the second subpixel SPX2 may be driven by a driving voltage VD1 having an average value matching the first optimized common voltage VOP_COM1 and a driving voltage VD2 having an average value matching the second optimized common voltage VOP_COM2, respectively. The driving voltage VD1 having the average value matching the first optimized common voltage VOP_COM1 may be generated according to a first gray level to gray level conversion characteristic, whereby a gray level GL(32) may be converted to first gray levels GL(60+), GL(16−), then according to a gray level to voltage conversion characteristic, whereby the gray levels GL(60+), GL(16−) may be converted to gray level voltages VG1(60+), VG1(16−) to act as the driving voltage VD1. The driving voltage VD2 having the average value matching the second optimized common voltage VOP_COM2 may be generated according to a second gray level to gray level conversion characteristic, whereby the gray level GL(32) may be converted to second gray levels GL(16+), GL(60−), then according to the same gray level to voltage conversion characteristic, whereby the gray levels GL(16+), GL(60−) may be converted to gray level voltages VG1(16+), VG1(60−) to act as the driving voltage VD2. The upper panel voltages VUL1 and VUL2 of the first subpixel SPX1 and the second subpixel SPX2 may be kept the same. In this way, the average values of the voltages VSPX1 and VSPX2 may match the first optimized common voltage VOP_ COM1 and the second optimized common voltage VOP_ COM2, respectively.

In conclusion, the method provided by the present invention is capable of effectively utilizing residual voltage of an LCD to reduce line image sticking of the LCD, which improves display quality.

Those skilled in the art will readily observe that numerous modifications and alterations of the device and method may be made while retaining the teachings of the invention.

What is claimed is:

1. A method of improving image sticking in a liquid crystal display (LCD) having a plurality of pixels, each pixel comprising a first subpixel and a second subpixel, the method comprising:

- driving the first subpixel of the plurality of pixels with a first optimized common voltage;
- driving the second subpixel of the plurality of pixels with a second optimized common voltage; and
- driving the LCD with a panel voltage;
- wherein the panel voltage is between the first optimized common voltage and the second optimized common voltage.

2. The method of claim 1, wherein the panel voltage is an average of the first optimized common voltage and the second optimized common voltage.

3. The method of claim 2, wherein driving the first subpixel of the plurality of pixels with the first optimized common voltage comprises:

- driving the first subpixel of the plurality of pixels with the panel voltage; and
- adjusting an equivalent capacitance of the first subpixel of the plurality of pixels for a voltage drop across the first subpixel of the plurality of pixels to match the first optimized common voltage;
- wherein driving the second subpixel of the plurality of pixels with the second optimized common voltage comprises:
  - driving the second subpixel of the plurality of pixels with the panel voltage; and
  - adjusting an equivalent capacitance of the second subpixel of the plurality of pixels for a voltage drop across the second subpixel of the plurality of pixels to match the second optimized common voltage.

4. The method of claim 2, wherein driving the first subpixel of the plurality of pixels with the first optimized common voltage comprises:

- driving the first subpixel of the plurality of pixels with the panel voltage; and
- adjusting a first upper panel voltage of the first subpixel of the plurality of pixels for a voltage drop across the first subpixel of the plurality of pixels to match the first optimized common voltage;
- wherein the first subpixel of the plurality of pixels is coupled to a first upper panel common terminal carrying the first upper panel voltage;
- wherein driving the second subpixel of the plurality of pixels with the second optimized common voltage comprises:
  - driving the second subpixel of the plurality of pixels with the panel voltage; and adjusting a second upper panel voltage of the second subpixel of the plurality of pixels for a voltage drop across the second subpixel to match the second optimized common voltage;

wherein the second subpixel of the plurality of pixels is coupled to a second upper panel common terminal carrying the second upper panel voltage.

5. The method of claim 4, further comprising driving the first subpixel and the second subpixel of the plurality of pixels with a lower panel voltage, wherein the first subpixel and the second subpixel of the plurality of pixels are coupled to a lower panel common terminal carrying the lower panel voltage.

6. The method of claim 5, wherein the lower panel voltage includes the panel voltage.

7. The method of claim 2, wherein driving the first subpixel of the plurality of pixels with the first optimized common voltage comprises:

driving the first subpixel of the plurality of pixels with an average value matching a driving voltage of the first optimized common voltage;

wherein driving the second subpixel of the plurality of pixels with the second optimized common voltage comprises:

driving the second subpixel of the plurality of pixels with an average value matching a driving voltage of the second optimized common voltage.

8. The method of claim 7, wherein driving the first subpixel of the plurality of pixels with the average value matching the driving voltage of the second optimized common voltage comprises:

converting a gray level to a first gray level voltage according to a first gray level to voltage conversion characteristic; and driving the first subpixel of the plurality of pixels with the first gray level voltage;

wherein driving the second subpixel of the plurality of pixels with the average value matching the driving voltage of the second optimized common voltage comprises:

converting the gray level to a second gray level voltage according to a second gray level to voltage conversion characteristic; and driving the second subpixel of the plurality of pixels with the second gray level voltage;

wherein the average values of the first gray level voltage and the second gray level voltage respectively match the first optimized common voltage and the second optimized common voltage.

9. The method of claim 7, wherein driving the first subpixel of the plurality of pixels with the average value matching the driving voltage of the first optimized common voltage comprises:

converting a gray level to a first gray level according to a first gray level to gray level conversion characteristic;

converting the first gray level to a first gray level voltage according to a gray level to voltage conversion characteristic; and driving the first subpixel of the plurality of pixels with the first gray level voltage;

wherein driving the second subpixel of the plurality of pixels with the average value matching the driving voltage of the second optimized common voltage comprises:

converting the gray level to a second gray level according to a second gray level to gray level conversion characteristic;

converting the second gray level to a second gray level voltage according to the gray level to voltage conversion characteristic; and driving the second subpixel of the plurality of pixels with the second gray level voltage;

wherein the average values of the first gray level voltage and the second gray level voltage respectively match the first optimized common voltage and the second optimized common voltage.

* * * * *